United States Patent [19]

Bedoussac

[11] Patent Number: 5,523,142
[45] Date of Patent: Jun. 4, 1996

[54] METAL FIXATION INSERT FOR A PLASTIC PART AND PART INCLUDING SUCH AN INSERT

[75] Inventor: Raymond Bedoussac, Brassac Les Mines, France

[73] Assignee: Sagem Allumage, Paris, France

[21] Appl. No.: 354,761

[22] Filed: Dec. 12, 1994

Related U.S. Application Data

[63] Continuation of Ser. No. 874,434, Apr. 27, 1992, abandoned.

[30] Foreign Application Priority Data

Apr. 25, 1991 [FR] France .................................. 91 05119

[51] Int. Cl.⁶ ........................................................ F02P 3/04
[52] U.S. Cl. .......................... 428/139; 428/595; 428/586; 428/35.8; 428/137; 428/138; 428/131; 428/192; 428/156; 428/457; 411/432; 411/436; 411/427; 411/908; 411/301; 411/61; 264/273; 123/634; 123/635
[58] Field of Search ...................... 428/595, 586, 428/35.8, 137, 138, 131, 139, 192, 156, 457; 411/432, 436, 427, 908, 301, 61; 264/273; 123/634, 635

[56] References Cited

U.S. PATENT DOCUMENTS

| | | | |
|---|---|---|---|
| 1,410,259 | 3/1922 | Kennedy | 411/61 |
| 2,064,435 | 12/1936 | Loeffler | 264/273 |
| 2,425,611 | 8/1947 | Frost et al. | 292/347 |
| 2,688,581 | 9/1954 | Stubbs | 264/273 |
| 3,388,627 | 6/1968 | Tinnerman | 411/432 |
| 3,582,867 | 6/1971 | Thompson et al. | 339/92 |
| 4,498,826 | 2/1985 | Simmonds | 411/301 |
| 4,986,769 | 1/1991 | Adams, III et al. | 439/681 |
| 5,020,953 | 6/1991 | Wada | 411/432 |
| 5,064,325 | 11/1991 | McRoskey | 411/432 |
| 5,241,941 | 9/1993 | Hancock et al. | 123/634 |
| 5,257,611 | 11/1993 | Chapekis et al. | 123/634 |

FOREIGN PATENT DOCUMENTS

| | | | |
|---|---|---|---|
| 962395 | 6/1950 | France . | |
| 1023043 | 3/1953 | France . | |
| 2184110 | 1/1979 | France . | |
| 167233 | 11/1950 | Germany | 411/301 |

Primary Examiner—William P. Watkins, III
Attorney, Agent, or Firm—Dennison, Meserole, Pollack & Scheiner

[57] ABSTRACT

The invention relates to a metal fixation insert for stiffening the fixation zone of a part of plastic material on a support. This metal fixation insert is made of rolled steel which is perforated.

8 Claims, 1 Drawing Sheet

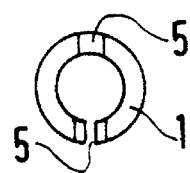
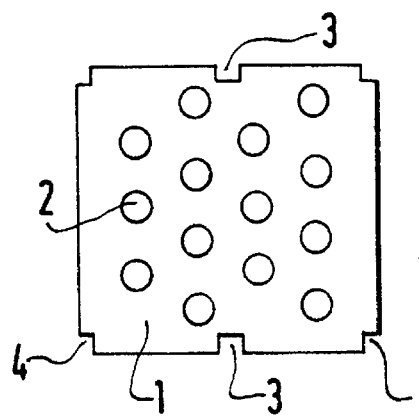
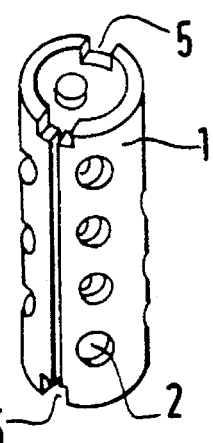
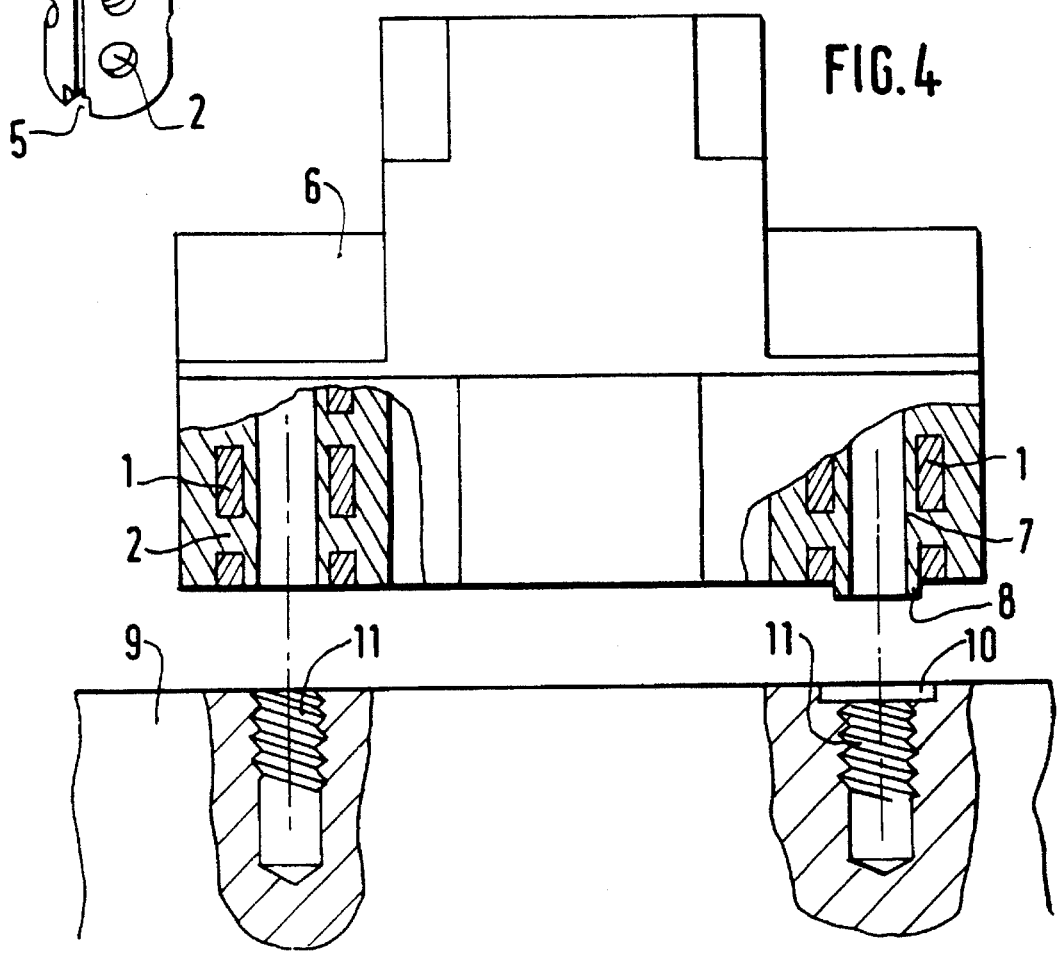
FIG.1 FIG.2 FIG.3 FIG.4

METAL FIXATION INSERT FOR A PLASTIC PART AND PART INCLUDING SUCH AN INSERT

This is a continuation of copending application Ser. No. 07/874,434 filed on Apr. 27, 1992 now abandoned.

FIELD OF THE INVENTION

The present invention relates to a metal fixation insert for stiffening the fixation zone of a part of plastic material on a support, and to a part of plastic material including such an insert.

BACKGROUND OF THE INVENTION

Metal fixation inserts are known, particularly in the ignition coils of automobile engines. These ignition coils include a casing of plastic material, in which tubular metal inserts are embedded during the molding, these inserts being pierced with bolts when the coil is installed. At one of their two axial ends, these tubular inserts form a bearing surface for the head of the bolt, and at their other axial end they form a bearing surface for the coil on its support.

These inserts of the known type are made by being cut from bar material, which is relatively tedious and has a certain number of other disadvantages.

First, these inserts are used in pairs, one insert of a pair generally having a "polarization" flange at one of its axial ends. The function of its flange, which when the coil is installed engages a countersunk face, is to assure that the coil is installed in the proper direction. The other insert of the coil does not have this flange and accordingly presses against a plane surface. As a result, two different types of inserts must be used.

In addition, when the casing of the coil is molded, the insert having the flange must be disposed in the proper location and in the right direction, with the threat of deterioration of the mold if these inserts are placed incorrectly.

OBJECT AND SUMMARY OF THE INVENTION

The object of the present invention is to overcome these disadvantages by furnishing a less expensive insert and a part made of plastic material, such as an ignition coil casing, including pairs of identical inserts, with the polarization function not being performed by these inserts.

This object is attained by the invention by a metal fixation insert for stiffening the fixation zone of a part made of plastic material on a support, characterized in that it is made of rolled sheet metal, and more particularly perforated sheet metal.

It is consequently especially simple to make the insert.

Moreover, the perforations in the sheet metal are filled, after molding, with plastic material, which assures that the insert will be held in place without recourse to annular grooves or machine turning as in the prior art.

The object of the present invention is also attained by a part made of plastic material including a fixation insert as described above.

In order that the insert will be suitably held in place, this part preferably has a layer of plastic material that coats the interior of the insert.

The polarization function is then preferably performed by lengthening this internal layer of plastic material, in such a way that it projects axially from one of the ends of the insert, thus forming a flange similar to that of the inserts of the prior art.

By way of non-limiting example, a particular embodiment of the invention will now be described, referring to the accompanying drawings.

BRIEF DESCRIPTION OF THE DRAWINGS

FIG. 1 is a plan view of an insert according to the invention;

FIG. 2 is a developed view of this;

FIG. 3 is a perspective view of it; and

FIG. 4 is a schematic front view, partially in section, of an ignition coil and its support.

DETAILED DESCRIPTION OF THE PREFERRED EMBODIMENT

The insert of FIGS. 1 to 3 is made by cutting from a metal sheet 1, whose thickness is between 1 and 2 mm, for example, and then rolling the thus-cut blank.

As shown in FIG. 2, this blank 1 includes perforations 2, and two of its sides form inside recesses, while its corners form cutouts 4. After rolling of the blank 1, the inside recesses 3 and the cutouts 4 form diametrically opposed notches 5 in the end edges of the furnished tubular insert.

Turning now to FIG. 4, an ignition coil is seen, whose casing 6, of plastic material, includes two inserts 1. These inserts are embedded in the plastic material, which penetrates the perforations 2 and forms a layer 7 on the inside of the inserts.

Towards one of the inserts, this layer 7 is lengthened axially toward the outside of the casing, to form an annular flange 8.

When the coil is installed on its support 9, the flange 8 engages a countersunk face 10 formed around the opening of one of two threaded holes 11, used to receive the fixation bolts, not shown, that pass through the inserts 1 for fixing the coil to the substrate 9.

The coil is compulsorily installed in the proper direction, because there is only a single flange 8, and the substrate 9 includes only a single countersunk face 10.

Consequently, the insert according to the invention can be obtained more economically than the known inserts, and its use is also more practical, especially because it makes it possible to shift the polarizing function to the part in which the insert is embedded.

What is claimed is:

1. An ignition coil support comprising a body portion (6) of plastic material, means within said body portion (6) for defining a fixation zone, and means for securement of the body portion (6) in a polarized position on a substrate, said means defining a fixation zone comprising a generally tubular metal fixation insert (1) for defining a through aperture and for reinforcing substantially the entire longitudinal extent of the fixation zone of said body portion (6) of plastic material to enable securement of the ignition coil support in a polarized position on a substrate provided with a countersunk face formed around a threaded hole adapted to be axially aligned with a longitudinal axis of the tubular insert to enable the through passage of a traversing threaded fastener which is telescopically received through said generally tubular insert for fixation of the fastener in the threaded hole, and wherein said insert (1) is formed of rolled sheet metal.

2. The insert (1) as defined by claim 1, in which the sheet metal forming the tubular insert (1) is perforated (2).

3. The ignition coil support as defined by claim 1, including a layer of plastic material (7) which coats the interior of the tubular insert (1).

4. The ignition coil support as defined by claim 3, wherein said means for polarizing the body portion (6) relative to the substrate (9), comprises said layer of plastic material (7) projecting axially (8) at one of the ends of the tubular insert (1) and being adapted to cooperate with the countersunk face (10) of the substrate.

5. In a part comprising an ignition coil support made of plastic material and including means for defining a fixation zone and including means for fixing the part in a polarized position by utilization of at least a traversing fastener to a support having means for receiving and securing the traversing fastener the improvement comprising a metal fixation insert for stiffening substantially the entire longitudinal extent of the fixation zone of said ignition coil support of plastic material to be traversed by the at least one fastener for fixing said part to the support, said metal fixation insert being made of rolled sheet metal having a generally tubular configuration for telescopic reception therethrough of the at least one fastener, said rolled sheet metal fixation insert having at least a perforation for receiving therethrough in locking engagement plastic material forming said part.

6. The part as defined by claim 5, in which a layer of plastic material coats the interior of the insert.

7. The part as defined by claim 6, in which said layer of plastic material includes a portion which projects axially at one of the ends of the insert, which axially projecting portion comprises a portion of the means for fixing the part in a polarized position.

8. A part comprising an ignition coil support formed of plastic material and including means for defining a fixation zone and adapted to be fixed in a polarized position to a support by at least a pair of traversing fasteners, said ignition coil support comprising at least a pair of tubular metal fixation inserts formed of perforated rolled sheet metal embedded within the plastic material forming part for stiffening substantially the entire longitudinal extent of the fixation zone, said fixation inserts being adapted for telescopic reception therethrough of the traversing fasteners, said plastic material providing a coating (7) in the interior of said tubular fixation inserts and said plastic coating (7) projecting axially from an end of one fixation insert for polarized cooperation with a complementary recess in the support.

* * * * *